United States Patent [19]
Beaulieu

[11] Patent Number: 5,991,510
[45] Date of Patent: Nov. 23, 1999

[54] REMOVABLE MEMORY DEVICE TO STORE ROBOTIC APPLICATION AND CONFIGURATION DATA

[75] Inventor: David R. Beaulieu, Groton, Mass.

[73] Assignee: Brooks Automation, Inc., Chelmsford, Mass.

[21] Appl. No.: 08/890,862

[22] Filed: Jul. 10, 1997

[51] Int. Cl.[6] .................................................. G05B 19/04
[52] U.S. Cl. .............................. 395/85; 395/80; 395/85; 395/89; 395/901; 318/568.11; 318/568.13; 318/568.23; 711/115
[58] Field of Search ................................ 395/80, 85, 89, 395/901; 364/191–193; 318/568.11, 568.13, 568.23; 711/115

[56] References Cited

U.S. PATENT DOCUMENTS

| | | | |
|---|---|---|---|
| 4,954,761 | 9/1990 | Kimura et al. | 395/80 X |
| 4,956,765 | 9/1990 | Iwagaya | 364/192 |
| 5,041,991 | 8/1991 | Fujiki | 395/83 X |

*Primary Examiner*—William Grant
*Assistant Examiner*—Victoria Robinson
*Attorney, Agent, or Firm*—Perman & Green, LLP

[57] ABSTRACT

A robot drive has operating and configuration parameters at an installation location stored in an easily removable storage device on the drive, or nearby, so that special data, such as that associated with arm design and system layout, including taught stations, can remain associated with the drive and installation whereby the drive system can be installed or replaced in minimal time since the storage device does not need reprogramming. This removable storage device, in the form of a static memory or Master Key, e.g., a Dallas Key or E Prom or the like, may be affixed to the robot body or off board nearby, and may store arm design parameters, programmed while on the robot body or off-line, and becomes a unique part structured for manufacturing with respect to the arm set design. Further, nominal system layout parameters can be prestored in the Key, and when this Key is affixed to the robot drive, the robot automatically has the information regarding both arm design and system layout, which will help avoid collisions and provide a starting point for the fine teaching of the transfer stations. Additionally, the fine location parameters for each transfer station may be stored in the Key when the robot is installed. Thus, the Key will contain all the information needed to make a robot unique to a unique system, and when a robot drive is replaced, by affixing the original Key to the new robot or nearby, it will assume all of the parameters of the initial robot.

35 Claims, 2 Drawing Sheets

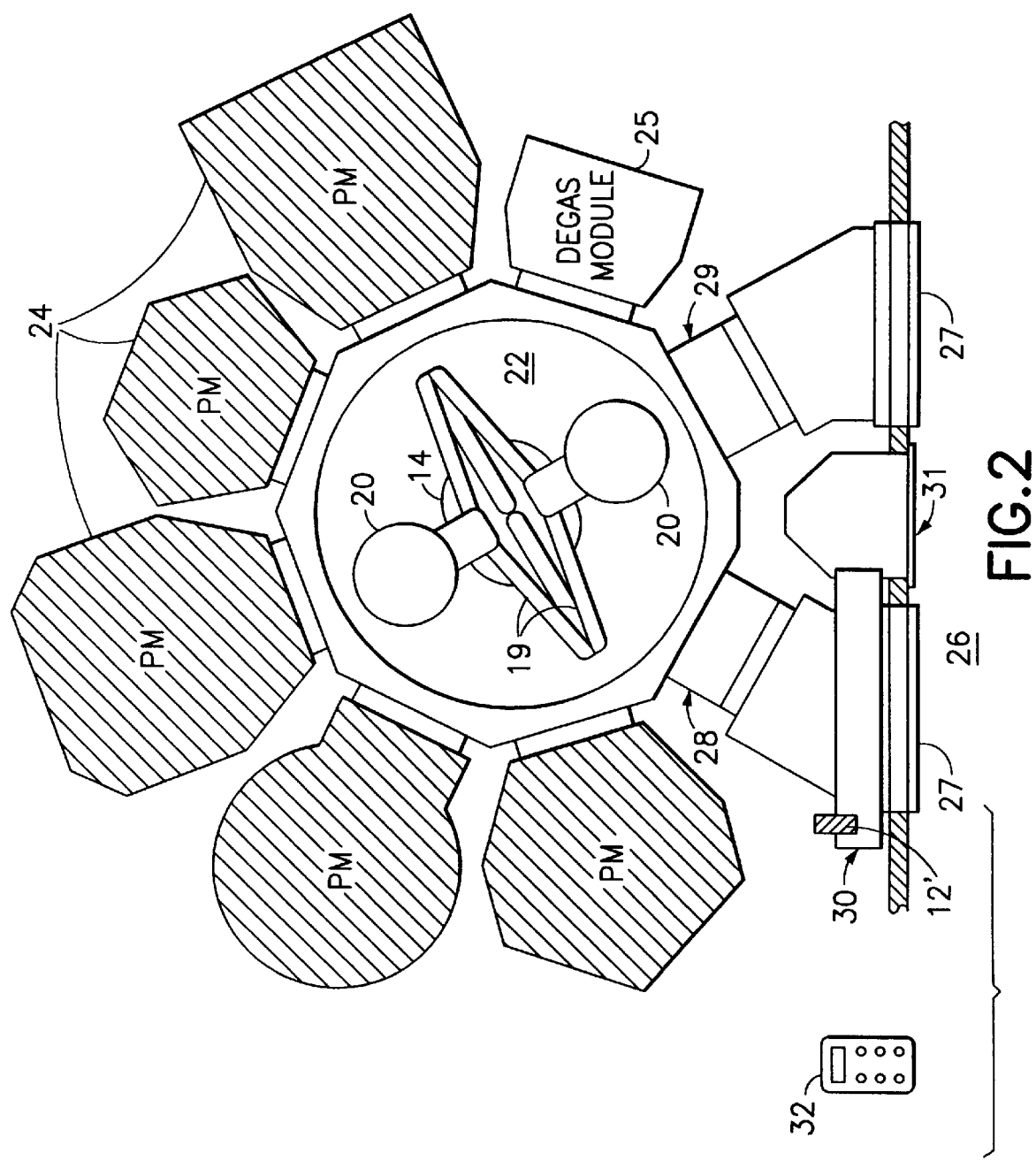

REMOVABLE MEMORY DEVICE TO STORE ROBOTIC APPLICATION AND CONFIGURATION DATA

CROSS-REFERENCE

This application contains subject matter related to that described in commonly-assigned U.S. patent application entitled, "Substrate Transport Drive System", filed on Jun. 12, 1997, under Ser. No. 08/873,693 and Express Mail Certificate No. EM029041240US, the disclosure of which is incorporated herein by reference in its entirety.

BACKGROUND OF THE INVENTION

1. Field of the Invention

The present invention relates to the control of robots and robot tools and, more particularly, to a method and means for facilitating the replacement or repair of a robot tool by packaging the controlling electronics such that the operating and configuration parameters are retained in a manner that obviates the need for re-teaching the drive unit upon the re-installing of the robot tool at a transfer station.

2. Prior Art

In many robotic applications, there are basic features of the drive mechanics and controlling electronics of the robot tool that are of standard construction. However, certain of the elements of the tool have different configurations, such as the arms, end effectors, and system layout (e.g., in a cluster tool) which require that specific information be stored by the robot electronics and firmware regarding their peculiar parameters.

There are at least two ways that robot drive controls can be designed. One way involves having the controlling electronics and software affixed to the drive (i.e., on board); the other is to locate the electronics away from the basic mechanics of the robot, typically in rack space (i.e., off board). Although there are various advantages in having on-board electronics, one clear disadvantage is that, when a robot drive must be replaced due to failure, the parameters associated with the specific arm configuration, tool setup, etc., stay with that robot and therefore the new robot drive must be re-taught before it is placed into service. Even in the case of off-board electronics, should the electronics become damaged, when they are replaced, the drive unit must also be re-taught. Further, when dealing with a number of different robots, it is usually necessary to have a master computer containing software with the versatility to provide the capability of programming each of the robot drives for operation at the particular location at which it is installed.

3. Problem to be Solved

It is therefore a problem in the art, when a robot drive is to be replaced or repaired, to maintain the electronics such that the operating and configuration parameters are retained in a manner that obviates the need for re-teaching the drive unit upon the re-installing of the robot.

4. Objects

It is accordingly an object of the present invention to provide a method and means for storing operating and configuration parameters of a robot drive in such a manner that the drive system can be installed or replaced in minimal time.

It is another object of the invention to provide a method and means for storing operating and configuration parameters of a robot drive in such a manner that the drive system can be installed or replaced without the need for re-teaching the drive unit controls.

It is a further object of the invention to provide a method and means for use with robots by which certain data associated with arm design and system layout, including taught stations, are stored on an easily removable storage device.

It is also an object of the invention to provide a method and means for use with robots involving the utilizing of a Master Key, in the form of a Dallas Key, an E Prom, or the like, which stores certain data associated with arm design and system layout, including taught stations, and which may be mounted on and easily removable from the robot device or disposed in close proximity thereto.

SUMMARY OF THE INVENTION

The present invention is directed to the control of robot tools and to providing a method and means for storing operating and configuration parameters of a robot drive in such a manner that the drive system can be installed or replaced in minimal time. The invention involves the incorporating of an easily removable storage device on the robot body or in close proximity in the installation, that stores special data associated with arm design and system layout. In a specific example, a static memory device, embodied by a Dallas Key, an E Prom, or the like, may be removably affixed to the robot body or drive as a Master Key, and used to store arm design parameters. This portable memory device can be programmed while on the robot body or off-line, such that the Master Key becomes a unique part and is structured for manufacturing with respect to the arm set design. When new arms of different designs are placed on the robot drive, the old Key can be removed and a new Key, storing the new arm parameters, can be installed without the need for separately providing additional data to the robot tool. Further, nominal system layout parameters can be prestored in the Key, such that the design and nominal system layout parameters can be assigned to a unique part with respect to the system design. Then, when the Key is affixed to the robot drive or disposed proximately off board, the robot automatically has information regarding both the arm design and the nominal system layout close at hand and portable. This will help avoid collisions and provide a starting point for the fine teaching at the transfer stations. Additionally, the fine location parameters for each transfer station may be stored in the Master Key device when the robot is installed, so that the Key will contain all the information needed to make a robot unique to a unique system. When a robot drive is replaced, by affixing the original Master Key to the new robot or conveniently off board, the new robot will assume all the parameters of the initial robot without further teaching. The need for a master computer with versatile software is obviated since information in the Master Key can be changed or adjusted using an on-board input device or a simple associated remote controller that is similarly portable.

BRIEF DESCRIPTION OF THE DRAWINGS

FIG. 2 is a diagrammatic plan view of the robot tool of FIG. 1 illustrating its disposition in an operable position in an exemplary cluster tool for wafer processing in which the invention may be implemented, and showing an alternative disposition of a Master Key on an off-board element.

DETAILED DESCRIPTION OF THE PREFERRED EMBODIMENT

Figure 1:
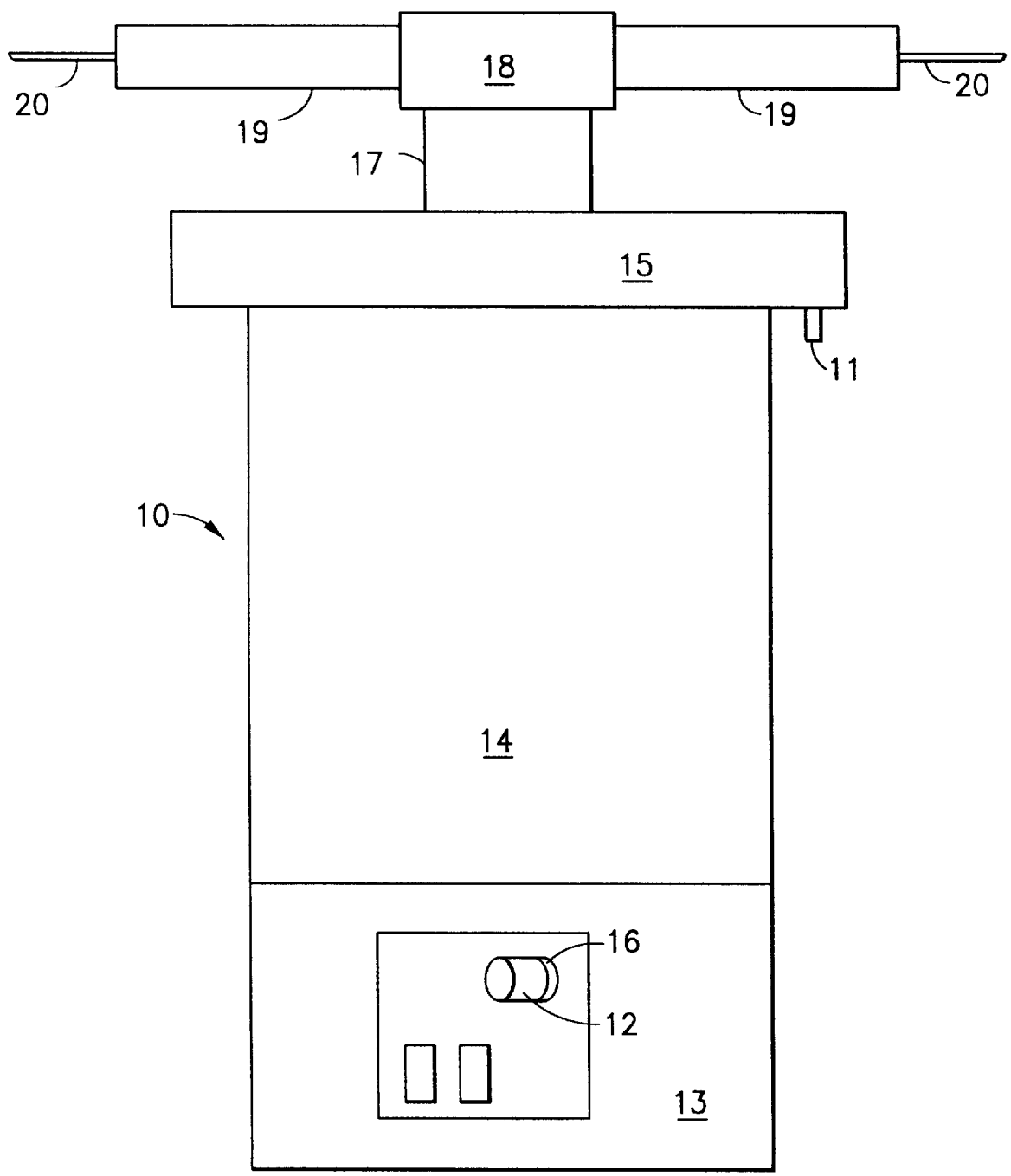
FIG. 1 is a diagrammatic view in elevation of a robot tool of a type incorporating the present invention and illustrating the disposition of a Master Key storage device on the tool in accordance with the invention.

A robot tool having an installed Master Key device in accordance with the present invention is shown diagrammatically in FIG. 1. The tool is constructed of a body 10 having a central section 14 for housing the robot drive, a controls section 13 at its base for housing the robot drive electronics, and a mounting flange 15, with a pin 11 for orientation, disposed on the top of the central section 14. Extending upwardly from the top of the body 10 is a robot drive shaft 17 supporting a hub portion 18 on which the robot arms 19 are mounted. The arms 19 are extendable and retractable, such as of the dual frog-arm type, and support end effectors 20 that extend outwardly therefrom and are adapted for holding a workpiece, such as a semiconductor wafer, thereon. A Master Key 12 in accordance with the invention is mounted on the robot body 10 at a convenient location, such as in the controls section 13 along with the robot drive electronics, and provides a method and means for storing operating parameters of the robot drive 14 in such a manner that the drive system can be installed or replaced in minimal time. To this end, the Master Key 12 is incorporated, for easy attachment and removal, in a mounting device 16 on the robot body 10, preferably in a location convenient to the drive 14, and stores special data associated with arm design and system layout, including taught stations. The structural form of the Master Key 12 and mounting device 16 may be of any available or special construction as appropriate to removably affix the Master Key 12 to the body 10, or in close proximity, and the selection of each will be within the purview of those of skill in the art given the particular machinery and installation with which they are to be used.

By way of a specific example, the Master Key 12 comprises a static memory device, e.g., embodied by a Dallas Key, an E Prom, or the like, that is removably affixed by mounting device 16, which may be of the bayonet-type, at the robot drive 14, for storing arm design parameters, and which can be programmed while on the robot body, or off-line, by suitable methods. As such, the Master Key 12 becomes a unique part and may be structured for manufacturing with respect to an associated arm set design. When new arms are placed on the robot drive, the Master Key 12 can be removed and reused or a new such Key installed without the need for providing additional or corrected data to reprogram the robot tool. Further, nominal system layout parameters can be prestored in the Master Key 12, such that the design and nominal system layout parameters can be assigned to this unique part with respect to the system design. Then, when the Key 12 is affixed to the robot body 10 at the drive 14, or alternatively located off board nearby in the installation, the robot automatically has information regarding both the arm design and the nominal system layout conveniently available in an associated device which is easily transferable with the robot or retained at the location for a subsequently installed robot. This conveniently available information will help avoid collisions during robot operation and provide a starting point for the fine teaching at the transfer stations. Additionally, the fine location parameters for each transfer station may be stored in the Master Key device when the robot is installed, e.g., using a simple remote controller, so that the Key will contain all of the information needed to make a unique system. When a robot drive is replaced, by affixing the original Master Key to the new robot, or disposing the Key off board nearby, the new robot will assume all the parameters of the initial robot without further teaching.

A Master Key in accordance with the invention may be used to store data for the operation of robot arms having end effectors for carrying frictionally-held workpieces, such as semiconductor wafers, in a transfer operation of a cluster tool as shown in FIG. 2. In this example the Master Key 12' is shown removably mounted in an alternative location on an off-board support 30, e.g., an electronics and computer chassis, near the robot body. The robot drive 14 of FIG. 1 is disposed in a cluster tool chamber 22 and has a suitable servo system for actuating the extendable and retractable arms 19 supporting the end effectors 20. A series of placement stations 24, in the form of processing modules (PM) and a degas module 25, are arranged about the cluster tool chamber 22 for interaction with the end effectors 20 during the transfer operations. The tool 22 and modules 24 and 25, in this example, are shown as disposed in communication with a clean room 26, and it will be understood that the invention may be implemented in either a vacuum or an atmospheric environment. In the arrangement shown, load locks 27, a wafer aligner module 28, a wafer cooler module 29, and an operator interface terminal 31, are provided for transferring the wafers being processed. A hand-held remote controller 32 for making any parameter or other data adjustments may also be provided.

The transfer operation using the cluster tool of FIG. 2 involves the following considerations with regard to the invention.

DATA LAYOUT

Arm/End Effector Data

When an arm is designed for a specific application, such as a cluster tool, there are many pieces of data that are required for the arm-actuating servo system to operate properly, such as:

the arm segment lengths;

the arm segment masses;

the end effector length;

the wafer/end effector coefficient of friction (required for a vacuum cluster tool where no other force is available to keep the wafer stable during acceleration);

the maximum arm retract position;

the maximum arm extend position; and several optimized servo parameters.

This data may be stored in the Master Key at the time of arm manufacture and the Master Key may be used in controlling the arm's subsequent operation in a robot tool at a transfer station.

System Layout Data

When a robot drive assembly is placed in a system for the first time, there are also several pieces of data that must be obtained to operate properly, such as:

the nominal reach (R), height (Z), and theta ($\theta$) position of each placement station in the tool, which can be used to define a maximum deviation such that the robot will not inadvertently crash into objects due to malfunction or operator error; and the exact transfer position in reach, height, and theta for all placement stations.

This data may also be stored in the Master Key at the time when a robot drive assembly for use with the preceding arm is placed in a system for the first time, so that these parameters, peculiar to the installation, are separately retained in the unique Master Key.

Robot Drive Data

In order to minimize set up time, the particular robot drive must also have some parameters, set either mechanically or through software, to ensure drive-to-drive consistency, such as:

the nominal (home) Z height from the robot mounting flange;

the nominal (home) theta, which is typically defined as arm mount position; and the arm mount calibration offsets, which are offsets found after the arm is mounted to account for any deviation due to mounting and can be assumed to be:

the nominal reach offset (in degrees);
the nominal theta offset (in degrees); and
the nominal Z offset (for pan A and B in two pan robots).

This data may additionally be stored in the Master Key so that these parameters, peculiar to the robot drive installed, are separately retained in the unique Master Key.

Thus, the Master Key of the invention can be used to store all of the foregoing data, and any other related parameters desired, and can be transferred from a replaced robot or robot drive to the replacement assembly without the need for extensive reprogramming. Consequently, the master computer of the prior art can be dispensed with and any data or other desired adjustments to the stored Master Key information can be affected with a simple remote controller.

As an alternative to permanently affixing parameters with each robot drive, one station, such as a load lock, may be taught by storing the appropriate data, and the differences between the old parameters and the new parameters in the data for that station, when a change is made, may be applied automatically to the remaining stations.

An exemplary manufacturing process achieving the invention may involve the following steps.

Manufacturing Process:
Robot Drives:

1. When a robot drive is manufactured, there is a calibration procedure that sets the nominal Z height of the coaxial shafts to a fixed dimension measured from the robot mounting flange. This parameter may be stored in the Master Key and becomes a permanent parameter associated with the robot drive.

2. Also when a robot drive is manufactured, there is a calibration procedure that sets the nominal angle of the first theta shaft and the second theta shaft defining the nominal arm theta and the nominal retract position. These parameters may be stored in the Master Key and become permanent parameters associated with the robot drive.

Robot Arm/End Effector Design

1. When the robot arm/end effectors are designed, the arm/servo specific data are programmed into the Master Key and this Master Key application is given a unique part number associated with the arm design. A Key is programmed for every arm set manufactured.

System Design

1. Optionally when a robot is being designed for a unique system layout, the Master Key, as already programmed in the manner indicated above, can additionally be programmed with the nominal system layout containing nominal station position parameters. These parameters can be used for collision avoidance and for creating a starting point for fine teaching. This Master Key application is given a unique part number associating both the arm design and system layout with either a unique system design or a particular customer. A Key may be programmed for every arm set manufactured.

System Integration

1. When a new robot is installed in a system, the unique Master Key, as designed above, is affixed to the robot body, or disposed off board nearby.

2. The robot arms associated with the Master Key application are installed on the robot.

3. An optional recalibration of the robot home parameters is made to accurately determine the home Z and theta as defined above. This data is stored in the robot drive.

4. A fine teach procedure is executed to fine calibrate one or multiple end effectors to the appropriate stations. These values are stored in the Master Key device.

System Re-Integration (Robot Drive/Arm Replacement)

1. The robot arms are removed from the robot.
2. The robot body is removed from the system.
3. The Master Key is removed from the robot body, i.e., the just removed or first robot body, or from an offboard location.
4. The Master Key is affixed to the second, i.e., new or repaired, robot body, or accompanies it for off-board installation.
5. The second robot is installed in the system.
6. The arms are installed on the second robot.
7. An optional recalibration of the robot home parameters is made to accurately determine the home Z and theta as defined above. This data is stored in the Master Key device associated with the robot drive.
8. Procedure complete.

The Master Key of the invention is thus suitable for use in various robots and robot installations, e.g., both in atmospheric and vacuum robots, and whether the operation is of the two or three axis type. It may also be implemented in related machinery installations.

It will therefore be seen that a method and means is described for storing operating and configuration parameters of a robot drive whereby the robot or drive system can be installed or replaced in minimal time by using an easily removable storage device on the robot body, or nearby, that stores special data associated with arm design and system layout, including taught stations, and which can be removed and remounted on the robot when an arm or the drive is removed and reinstalled or replaced.

What is claimed is:

1. Apparatus for controlling the operation of a robot tool having a body for mounting a drive mechanism and at least one arm driven thereby, comprising:

memory means for prestoring nominal system layout parameters for said robot tool and storing operating information relating to said drive mechanism and said at least one arm of said robot tool at a tool installation location;

mounting means for removably mounting said memory means in association with said body, whereby when any of said body, drive mechanism, and at least one arm is removed and re-installed or replaced, said memory means may remain associated with said body and installation location to avoid having to be reprogrammed; and wherein said robot tool has associated placement stations having reach, height, and theta positions, and wherein said nominal system layout parameters comprise:

the nominal reach, height, and theta position of each placement station associated with said robot tool, whereby a maximum deviation may be defined to prevent said at least one arm from inadvertently crashing into objects due to malfunction or operator error; and the exact transfer positions in reach, height, and theta for all of said placement stations.

2. Apparatus as in claim 1 wherein said memory means comprises means for storing fine location parameters for a placement station at which said at least one arm is installed.

3. Apparatus as in claim 1 wherein said memory means comprises a static memory device.

4. Apparatus as in claim 1 wherein said memory means comprises a Master Key selected from the group consisting of a Dallas Key, an E Prom, and the like.

5. Apparatus as in claim 1 wherein said mounting means comprises means for removably affixing said memory means to said robot body.

6. Apparatus as in claim 1 wherein said mounting means comprises means for removably affixing said memory means to said drive mechanism.

7. Apparatus as in claim 1 wherein said mounting means comprises means for removably affixing said memory means to an off-board element located near said robot tool.

8. A method for controlling the operation of a robot tool having a body mounting a drive mechanism and at least one arm driven by said drive mechanism, comprising the steps of:

storing operating information, relating to said drive mechanism and said at least one arm of said robot tool at a tool installation location, in a storage device;

removably affixing said storage device in association with said body;

when any of said body, drive mechanism, and at least one arm is removed and re-installed or replaced at said installation location, retaining said storage device in association with said body and installation location to avoid the need for reprogramming said storage device; and wherein said robot tool has a mounting flange and said drive mechanism comprises coaxial shafts and said step of storing operating information comprises, at the time of manufacturing said drive mechanism, calibrating and setting the nominal Z height of said coaxial shafts to a fixed dimension measured from the flange for mounting said robot, and storing said fixed dimension in said storage device.

9. The method of claim 8 comprising the further step of prestoring nominal system layout parameters for said robot tool in said storage device.

10. The method of claim 8 comprising the further step of storing fine location parameters, for a transfer station at which said at least one arm is installed, in said storage device.

11. The method of claim 8 wherein said storage device comprises a Master Key selected from the group consisting of a Dallas Key, an E Prom, and the like.

12. The method of claim 8 wherein said step of removably affixing said storage device comprises affixing said storage device to said body.

13. The method of claim 8 wherein said step of removably affixing said storage device comprises affixing said storage device to said drive mechanism.

14. The method of claim 8 wherein said step of removably affixing said storage device comprises affixing said storage device to an off-board element located near said robot tool.

15. Apparatus for controlling the operation of a robot tool having a body for mounting a drive mechanism and at least one arm driven thereby, comprising:

memory means for storing operating information relating to said drive mechanism and said at least one arm of said robot tool at a tool installation location;

mounting means for removably mounting said memory means in association with said body, whereby when any of said body, drive mechanism, and at least one arm is removed and re-installed or replaced, said memory means may remain associated with said body and installation location to avoid having to be reprogrammed; and wherein said robot tool has a mounting flange and said memory means comprises means for storing parameters for said drive mechanism, said parameters relating to said at least one arm and comprising:

the nominal (home) Z height of said drive mechanism from said robot body mounting flange;

the nominal (home) theta, typically the mounting position of said at least one arm; and the calibration offsets of said mounting position of said at least one arm, which offsets are determined after said at least one arm is mounted to account for any deviation due to mounting, and comprise:

the nominal reach offset (in degrees);

the nominal theta offset (in degrees); and the nominal Z offset.

16. Apparatus as in claim 15 wherein said robot tool has associated placement stations and said memory means comprises means for storing fine location parameters for a placement station at which said at least one arm is installed.

17. Apparatus as in claim 15 wherein said memory means comprises a static memory device.

18. Apparatus as in claim 15 wherein said memory means comprises a Master Key selected from the group consisting of a Dallas Key, an E Prom, and the like.

19. Apparatus as in claim 15 wherein said mounting means comprises means for removably affixing said memory means to said robot body.

20. Apparatus as in claim 15 wherein said mounting means comprises means for removably affixing said memory means to said drive mechanism.

21. Apparatus as in claim 15 wherein said mounting means comprises means for removably affixing said memory means to an off-board element located near said robot tool.

22. Apparatus for controlling the operation of a robot tool having a body for mounting a drive mechanism and at least one arm driven thereby, comprising:

memory means for storing operating information relating to said drive mechanism and said at least one arm of said robot tool at a tool installation location;

mounting means for removably mounting said memory means in association with said body, whereby when any of said body, drive mechanism, and at least one arm is removed and re-installed or replaced, said memory means may remain associated with said body and installation location to avoid having to be reprogrammed; and wherein said at least one arm is mounted in a cluster tool and comprises end effector means for frictionally holding a workpiece thereon, and said memory means stores arm design parameters comprising:

the arm segment lengths;

the arm segment masses;

the length of said end effector means;

the workpiece/end effector means coefficient of friction;

the maximum arm retract position; and the maximum arm extend position.

23. Apparatus as in claim 22 wherein said robot tool has associated placement stations and said memory means comprises means for storing fine location parameters for a placement station at which said at least one arm is installed.

24. Apparatus as in claim 22 wherein said memory means comprises a static memory device.

25. Apparatus as in claim 22 wherein said memory means comprises a Master Key selected from the group consisting of a Dallas Key, an E Prom, and the like.

26. Apparatus as in claim 22 wherein said mounting means comprises means for removably affixing said memory means to said robot body.

27. Apparatus as in claim 22 wherein paid mounting means comprises means for removably affixing said memory means to said drive mechanism.

28. Apparatus as in claim 22 wherein said mounting means comprises means for removably affixing said memory means to an off-board element located near said robot tool.

29. A method for controlling the operation of a robot tool having a body mounting a drive mechanism and at least one arm driven by said drive mechanism, comprising the steps of:

storing operating information, relating to said drive mechanism and said at least one arm of said robot tool at a tool installation location, in a storage device;

removably affixing said storage device in association with said body;

when any of said body, drive mechanism, and at least one arm is removed and re-installed or replaced at said installation location, retaining said storage device in association with said body and installation location to avoid the need for reprogramming said storage device; and wherein said drive mechanism comprises a first theta shaft and a second theta shaft defining nominal arm theta and nominal retract position, and said step of storing operating information comprises, at the time of manufacturing said drive mechanism, calibrating and setting the nominal angle of the first theta shaft and the second theta shaft, and storing said nominal angles in said storage device.

30. The method of claim 29 comprising the further step of prestoring nominal system layout parameters for said robot tool in said storage device.

31. The method of claim 29 comprising the further step of storing fine location parameters, for a transfer station at which said at least one arm is installed, in said storage device.

32. The method of claim 29 wherein said storage device comprises a Master Key selected from the group consisting of a Dallas Key, an E Prom, and the like.

33. The method of claim 29 wherein said step of removably affixing said storage device comprises affixing said storage device to said body.

34. The method of claim 29 wherein said step of removably affixing said storage device comprises affixing said storage device to said drive mechanism.

35. The method of claim 29 wherein said step of removably affixing said storage device comprises affixing said storage device to an off-board element located near said robot tool.

* * * * *